(12) United States Patent
Itoh et al.

(10) Patent No.: US 6,834,028 B2
(45) Date of Patent: Dec. 21, 2004

(54) OPTICAL DISK DEVICE CAPABLE OF PERFORMING HIGH SPEED SEEKING TIME

(75) Inventors: Fumihiro Itoh, Yawata (JP); Jun Kikuchi, Takatsuki (JP)

(73) Assignee: Matsushita Electric Industrial Co., Ltd. (JP)

( * ) Notice: Subject to any disclaimer, the term of this patent is extended or adjusted under 35 U.S.C. 154(b) by 138 days.

(21) Appl. No.: 10/279,020

(22) Filed: Oct. 24, 2002

(65) Prior Publication Data

US 2003/0081512 A1 May 1, 2003

(30) Foreign Application Priority Data

Oct. 31, 2001 (JP) ........................................ 2001-334904

(51) Int. Cl.[7] ............................................. G11B 21/08
(52) U.S. Cl. ................................................... 369/30.17
(58) Field of Search ........................... 369/30.16, 30.17, 369/30.1, 30.11, 30.12, 30.13, 30.14, 44.2, 44.27, 44.29, 44.34, 44.35

(56) References Cited

U.S. PATENT DOCUMENTS

| | | | | |
|---|---|---|---|---|
| 5,195,067 A | * | 3/1993 | Yanagi | 369/30.17 |
| 5,428,590 A | * | 6/1995 | Ogino | 369/44.28 |
| 5,689,482 A | * | 11/1997 | Iida | 369/30.1 |
| 5,802,019 A | * | 9/1998 | Yamada | 369/30.17 |
| 5,808,975 A | * | 9/1998 | Tani | 369/30.15 |
| 5,870,356 A | * | 2/1999 | Ikeda | 369/30.15 |
| 6,154,424 A | | 11/2000 | Kao et al. | 369/44.28 |
| 6,724,695 B2 | * | 4/2004 | Kumagami et al. | 369/30.17 |

FOREIGN PATENT DOCUMENTS

JP            10091975 A        4/1998

* cited by examiner

Primary Examiner—Tan Dinh
(74) Attorney, Agent, or Firm—Parkhurst & Wendel, L.L.P.

(57) ABSTRACT

The present invention provides an optical disk device that reduces a track lead-in time associated with a seek time. A switching means 50 includes a multiplier A 11 for multiplying an output of a speed control means 5 by α and a multiplier B 12 for multiplying an output of a position control means 6 by (1-α), and an adder 13 for adding an output of the multiplier A 11 and an output of the multiplier B 12 to output a result of the addition as control input to an actuator driving means 8. At the time of movement of an optical pickup 3 toward a target track, the multiplier factor α for the multipliers A 11 and B 12 is set at 0, thereby performing control of the actuator driving means 8 by means of the position control means 6. After the optical pickup 3 reaches the vicinity of the target track, the multiplier factor α is set to be gradually increased from 0 to 1 at a predetermined ratio, whereby the speed control means 5 is gradually made operate to make the lens 2 follow the eccentricity of the optical disk 1.

15 Claims, 11 Drawing Sheets

OPTICAL DISK DEVICE CAPABLE OF PERFORMING HIGH SPEED SEEKING TIME

FIELD OF THE INVENTION

The present invention relates to an optical disk device and, more particularly, to an optical disk device that reduces a seek time.

BACKGROUND OF THE INVENTION

Conventional optical disk devices prevent swings of a lens of a pickup at seeking, under position control and speed control, to perform high-speed seeking.

Here, a conventional optical disk device will be described with reference to FIG. 14. FIG. 14 is a block diagram illustrating a structure of a conventional optical disk device.

In FIG. 14, reference numeral 1 denotes an optical disk in which information is recorded on spiral tracks. A lens 2 focuses laser light on the optical disk 1, and is driven in axial and radial directions of the optical disk 1 by means of an actuator (not shown) provided on an upper part of the main body of an optical pickup 3. The optical pickup 3 applies laser light to the lens 2, and receives reflected light from the optical disk 1 to generate a signal that detects track crossing of the laser light on the optical disk 1 (hereinafter, abbreviated as a "track crossing signal"), a signal that detects deviation of the lens 2 from the center position on the optical pickup 3 (hereinafter, abbreviated as a "position detection signal"), a signal that indicates defocusing of the laser light on the optical disk 1 (hereinafter, abbreviated as a "focus error signal"), and a signal that indicates deviation of the laser light from the center of the track (hereinafter, abbreviated as a "tracking error signal"). A traverse driving means 4 drives the optical pickup 3 in the radial direction of the optical disk 1. A speed control means 5 measures a movement speed of the lens 2 on the basis of the track crossing signal that is generated by the optical pickup 3, and controls an actuator driving means 8 such that the movement speed of the lens 2 follows a target movement speed. A position control means 6 controls the actuator driving means 8 on the basis of the tracking error signal generated by the optical pickup 3 such that a midpoint of the lens 2 follows the center position of the optical pickup 3. A switching means 7 switches between outputs of the speed control means 5 and the position control means 6, to decide control input to the actuator driving means 8. The actuator driving means 8 controls the actuator provided on the optical pickup 3 to drive the lens 2 in the axial and radial directions of the optical disk 1. A system control means 9 reads information about a target speed of the optical pickup 3, which is previously set in a table corresponding to a speed profile 10, and controls the traverse driving means 4 and the actuator driving means 8 on the basis of the read information. The speed profile 10 is a table in which driving speed increasing/decreasing patterns for promptly moving the optical pickup 3 to a target track are described. A track lead-in means 30 guides the optical pickup 3 to the center position of the track on the optical pickup 1 on the basis of the tracking error signal, and it can make the optical pickup 3 follow the center of the track of the optical disk 1.

FIG. 15 is a diagram for explaining the speed control means 5. In this figure, the ordinate represents the movement speed of the lens 2 and the movement speed of the optical disk 1 varying due to eccentricity, and the abscissa represents the time.

When the traverse driving means 4 receives a command instructing a seek operation from the system control means 9, it moves the optical pickup 3 to a predetermined position, in accordance with a target speed that is previously set in the speed profile 10. At this time, the lens 2 that is provided on the optical pickup 3 via the actuator is moved while swinging as the optical pickup 3 is moved. Thus, the speed control means 5 performs the speed control such that the lens 2 has a fixed movement speed, thereby preventing swings of the lens 2 at the seek time, and realizing a prompt lead-in to the target track.

Actually, however, the optical disk 1 is also off-centered (radially swinging) while rotating, and there exists changes in the speed like SIN waves as shown in FIG. 15. Accordingly, the speed control means 5 controls the actuator driving means 8 for making the lens 2 follow the disk eccentricity shown by a broken line, and keeping a relative speed between the movement speed of the lens 2 and the movement speed of the optical disk 1 at a constant value. Therefore, the speed control means 5 that operates so as to make the movement speed of the lens 2 follow the changes in the speed of the optical disk 1 due to the eccentricity before leading into the target track immediately before the end of the seek operation, and to make the relative speed between the lens 2 and the optical disk 1 0 (zero) is effective.

On the other hand, as the speed control means 5 drives the traverse driving means 4 through the system control means 9, particularly when the traverse driving means 4 is sensitive to control inputs of a stepping motor and the like, the traverse driving means 4 sometimes responds too much to changes in the speed due to interference such as eccentricity or swings of the optical disk 1, so that step-out occurs at high-speed rotation, and the seek time is unfavorably delayed greatly.

FIG. 16 is a diagram for explaining the position control means 6 (lens midpoint control). In this figure, the ordinate represents the actuator sensitivity of the lens 2 at the seek time of the optical pickup 3, and the abscissa represents the amount of swings of the lens 2 (lens shift). This figure shows the state where the actuator sensitivity of the lens 2 varies according to the lens shift.

As shown in FIG. 16, a state in which the lens shift amount is zero, indicating that the lens 2 is located at the center of the optical pickup 3, is a state in which the actuator sensitivity is the highest. At this time, the response speed of the actuator to the control input from the actuator driving means 8 is the highest. Therefore, the lens 2 swings hard at the seek time when the optical pickup 3 is moving at high speeds, and thus, the position control means 6 that controls the lens 2 for being positioned at the center of the optical pickup 3 is effective. There are also merits that the position control means 6 controls only the actuator driving means 8, and the traverse driving means 4 can be controlled by the speed profile 10 independently.

On the other hand, the position control means 6 cannot control the movement speed of the lens 2 for following the movement speed of the optical disk 1 due to the eccentricity. Accordingly, there are some cases where the leading into the target track is delayed in the case of the optical disk 1 having larger eccentricity.

An operation of the conventional optical disk device that is constructed as described above will be described with reference to FIG. 17.

FIG. 17 is a diagram showing the operation of the conventional optical disk device immediately before an end of seeking. In this figure, the ordinate represents the sensitivity and movement speed of the lens 2, and the abscissa represents the seek time.

Initially, at high-speed movements of the lens 2 and the optical pickup 3 from when the seek operation is started until the optical pickup 3 reaches the vicinity of the target track, the switching means 7 is connected to the position control means 6 to control the lens shift, thereby keeping the lens in a high sensitivity state.

Then, when the optical pickup 3 reaches the vicinity of the target track, the switching means 7 is switched from the position control means 6 to the speed control means 5, and the lens 2 and the optical pickup 3 are moved at low speeds by the actuator driving means 6 and the traverse driving means 4, respectively, thereby enabling the movement speed of the lens 2 to follow the movement speed of the optical disk 1 due to the eccentricity. In this figure, reference S1 denotes the speed of the optical disk 1 due to the eccentricity (in reality, the optical disk 1 does not have a fixed speed but is swinging), and the lens 2 is controlled for following this speed S1.

When a rough seek operation for moving the optical pickup 3 to the vicinity of the target track on the optical disk by means of the traverse driving means 4 is completed, the optical disk device goes into a track lead-in state. Further, after the lead-in of the lens 2 to the target track is completed, the tracking servo control is performed to trace the target track.

At this time, the movement speed of the lens 2 controlled by the position control means 6 and the movement speed of the lens 2 controlled by the speed control means 5 do not always coincide with each other, and there is a difference E1 between the speeds. Then, a lens shift occurs to compensate the difference E1, and accordingly the actuator sensitivity is deteriorated up to K1. Thus, in order to speed up the seek time, it is desirable that the driving control of the actuator should be performed by means of the position control means 6, thereby turning the sensitivity of the lens 2 into a good condition as well as moving the optical pickup 3 as near the target track as possible, and thereafter, the speed control means 5 for controlling the movement speed of the lens 2 to follow the movement speed of the optical disk 1 due to the eccentricity should be selected to shorten the time (T1) for leading into the target track.

However, in the conventional optical disk device, there is a difference between the movement speed of the lens under control of the position control means 6 and the movement speed of the lens under control of the speed control means 5. Therefore, when the control input to the actuator driving means 8 is abruptly switched by the switching means 7 as a simple switch, the lens 2 unfavorably vibrates, and the control by the speed control means 5 is hardly stabilized, whereby the convergence takes a long time. Accordingly, the sensitivity of the actuator is deteriorated, resulting in a longer track lead-in time (T1).

SUMMARY OF THE INVENTION

The present invention has for its object to provide an optical disk device that reduces a track lead-in time associated with a seek time.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided an optical disk device including: an optical pickup for applying laser light to an optical disk via a lens, and receiving reflected light from the optical disk; an actuator for driving the lens in axial and radial directions of the optical disk on the optical pickup; a traverse driving means for driving the optical pickup in a radial direction of the optical disk so that a movement speed of the optical pickup becomes a preset target speed; a position control means for controlling the driving of the actuator so that the lens follows a center position of the optical pickup; a speed control means for controlling the driving of the actuator so that the lens has the target movement speed; a switching means for switching the control for the driving of the actuator between control by the position control means and control by the speed control means; and a system control means for controlling the switching means to select the position control means when a seek operation is started, while selecting the speed control means when the optical pickup comes to a vicinity of a target track on the optical disk, and in this optical disk device, the system control means controls the switching means so that the switching between the position control means and the speed control means is performed in stages. Therefore, the position control means is used immediately before the leading into the target track, and then the position control means is switched to the speed control means, whereby the lens can be made follow the eccentricity of the optical disk while maintaining a high actuator sensitivity, and accordingly the leading into the target track can be achieved in a shorter time.

According to a 2nd aspect of the present invention in the optical disk device of the 1st aspect, the system control means proportionally increases distribution of the control for the driving of the actuator by the speed control means according to the number of remaining tracks up to the target track while moving the optical pickup to the vicinity of the target track on the optical disk, thereby switching the control for the driving of the actuator from the control by the position control means to the control by the speed control means in stages. Therefore, the timing of the switching of the control for the actuator driving means from the control by the position control means to the control by the speed control means can be delayed, and further the lens can be made follow the eccentricity of the optical disk while maintaining a high actuator sensitivity, whereby the leading into the target track can be achieved in a shorter time.

According to a 3rd aspect of the present invention, in the optical disk device of the 1st aspect, the system control means controls the switching means at change of the preset target speed of the optical pickup. Therefore, the switching is performed at a time when a difference between the movement speed of the lens under control by the position control means and the movement speed of the lens under control by the speed control means is small, thereby suppressing vibrations of the lens, and achieving the leading into the target track in a shorter time.

According to a 4th aspect of the present invention, in the optical disk device of the 3rd aspect, the system control means proportionally increases distribution of the control for the driving of the actuator by the speed control means according to the number of points at which the target speed of the optical pickup is changed in the switching from the position control means to the speed control means by the switching means. Therefore, the vibrations of the lens can be suppressed, and the leading into the target track can be achieved in a shorter time.

According to a 5th aspect of the present invention, in the optical disk device of any of the 1st to 4th aspects, the system control means switches the control for the driving of the actuator from the control by the speed control means to the control by the position control means, when detecting that the speed control means does not operate normally during the control for the driving of the actuator performed by the speed control means. Therefore, running out of control of the traverse driving or the like due to abnormal operations of the speed control means can be prevented.

According to a 6th aspect of the present invention, the optical disk device of the 5th aspect includes a differentiation means for obtaining a differential value of the movement speed of the lens, which is measured by the speed control means, and deciding that the speed control means does not operate normally when the obtained differential value is larger than a predetermined value, and the system control means controls the switching means on the basis of a result of the decision by the differentiation means. Therefore, running out of control of the traverse driving or the like can be predicted and prevented when the movement speed of the lens greatly changes.

According to a 7th aspect of the present invention, the optical disk device of the 5th aspect includes a comparison means for obtaining a difference between the movement speed of the lens, which is measured by the speed control means, and the preset target speed, and deciding that the speed control means does not operate normally when the difference is larger than a predetermined value, and the system control means controls the switching means on the basis of a result of the decision by the comparison means. Therefore, running out of control of the traverse driving or the like can be predicted and prevented when the movement speed of the lens is out of the target speed.

According to an 8th aspect of the present invention, the optical disk device of the 5th aspect includes a focus error detection means for measuring an amount of focus deviation of the laser light on the optical disk when a focus error signal indicating a focus deviation of the laser light on the optical disk is detected from the reflected light received by the optical pickup, and deciding that the speed control means does not operate normally when the deviation amount is larger than a predetermined value, and the system control means controls the switching means on the basis of a result of the decision by the focus error signal detection means. Therefore, running out of control of the traverse driving or the like is predicted and prevented when the defocusing of the laser light on the optical disk occurs.

According to a 9th aspect of the present invention, in the optical disk device of the 1st aspect, the system control means adjusts a timing of the switching by the switching means from the position control means to the speed control means to be at a position nearer the target track. Therefore, the timing of the switching of the control for the actuator driving means from the control by the position control means to the control by the speed control means can be set at an optimum timing according to the environmental conditions, or variations of the optical disk device or the optical disk.

According to a 10th aspect of the present invention, the optical disk device of the 9th aspect includes an eccentricity detection means for measuring an amount of eccentricity of the optical disk on the basis of a track crossing signal indicating track crossing of the laser light, which is detected from the reflected light received by the optical pickup, and the system control means adjusts the timing of the switching by the switching means from the position control means to the speed control means to be at a position much nearer the target track when the eccentricity amount of the optical disk, measured by the eccentricity detection means, is smaller than a predetermined value. Therefore, the lens can be made follow the eccentricity of the optical disk at the seek time while maintaining a higher actuator sensitivity, whereby the leading into the target track can be achieved in a shorter time.

According to an 11th aspect of the present invention, in the optical disk device of the 9th aspect, the system control means adjusts the timing of the switching by the switching means from the position control means to the speed control means to be at a position further nearer the target track when the control for the driving of the actuator by the speed control means has been performed normally and a next movement of the optical pickup to the target track is performed. Therefore, the lens can be made follow the eccentricity of the optical disk at the next seek time while maintaining a further higher actuator sensitivity, whereby the leading into the target track can be achieved in a shorter time.

According to a 12th aspect of the present invention, in the optical disk device of the 9th aspect, when the optical pickup is led into the target track after a rough seek operation for moving the optical pickup to a position near the target track on the optical dick has been finished, the system control means counts the number of re-leading processes when leading of the optical pickup into the track has failed and then re-leading is performed, and adjusts the timing of the switching by the switching means from the position control means to the speed control means to be at a position further nearer the target track at a next movement of the optical pickup to the target track on the optical disk, when the counted number of re-leading processes is smaller than a preset number after the leading operation has been finished. Therefore, the lens can be made follow the eccentricity of the optical disk at the next seek time while maintaining a further higher actuator sensitivity, whereby the leading into the target track can be achieved in a shorter time.

According to a 13th aspect of the present invention, in the optical disk device of any of the 9th to 12th aspect, the system control means judges a movement direction in which the optical pickup is moved toward the target track on the optical disk, and sets timings of the switching by the switching means from the position control means to the speed control means adaptively to an inner circumference direction and an outer circumference direction of the optical disk, respectively. Therefore, an optimum timing can be set according to the movement directions of the optical pickup and the lens.

According to a 14th aspect of the present invention, in the optical disk device of the 1st aspect, the switching means includes a first shift register for multiplying an output signal of the speed control means by "α"; a second shift register for multiplying an output signal of the position control means by "(1−α)"; and an adder for adding output signals of the first and second shift registers, and the system control means gradually increases a value of "α" of the first shift register to gradually increase allocation of control for driving the actuator by the speed control means over control for driving the actuator by the position control means. Therefore, the switching means can be implemented with a simple construction.

According to a 15th aspect of the present invention, in the optical disk device of the 1st aspect, a semiconductor element in which the speed control means, the position control means and the switching means are integrated.

Therefore, high-speed operation processing can be performed without requiring additional hardware, whereby smooth switching between the speed control means and the position control means can be realized with a smaller delay due to the operation processing.

DETAILED DESCRIPTION OF THE PREFERRED EMBODIMENTS

Hereinafter, embodiments of the present invention will be described with reference to the drawings.

[Embodiment 1]

An optical disk device according to a first embodiment of the present invention will be described.

Figure 1:
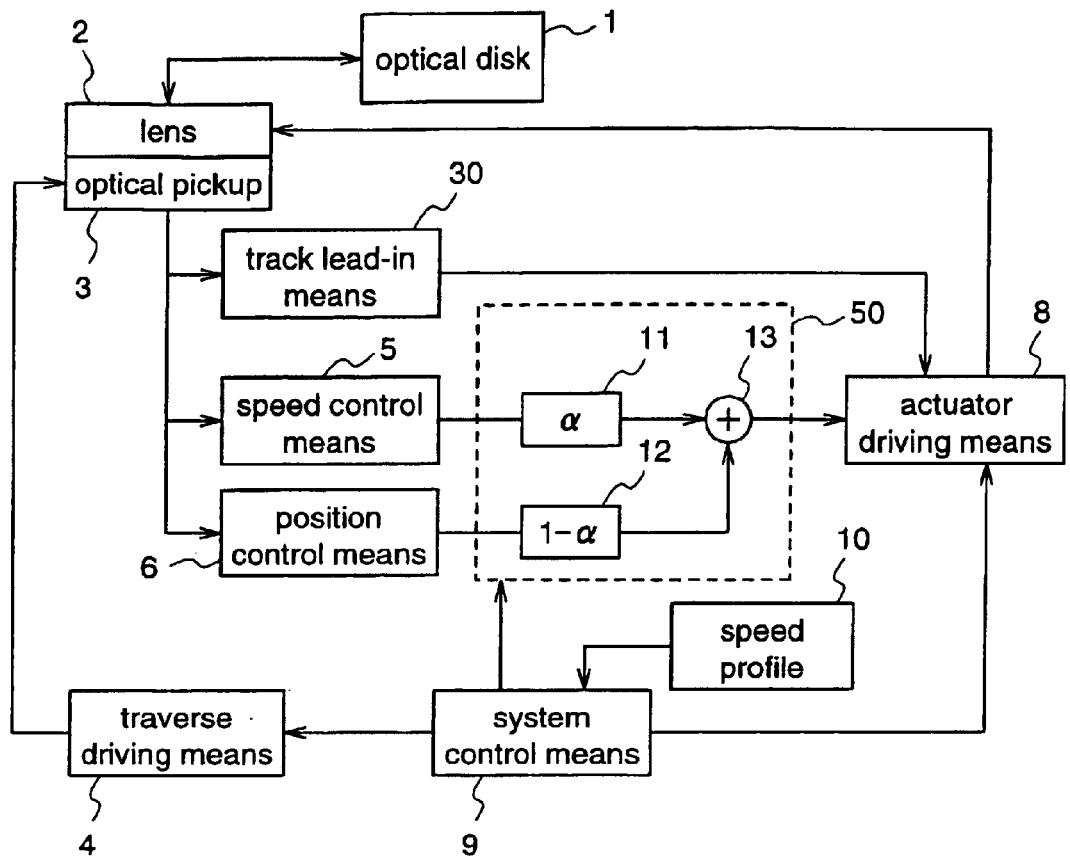
FIG. 1 is a block diagram illustrating a structure of an optical disk device according to a first embodiment of the present invention.

FIG. 1 is a block diagram illustrating a structure of the optical disk device according to the first embodiment.

In FIG. 1, reference numeral 1 denotes an optical disk in which information is recorded on spiral tracks. A lens 2 focuses laser light on the optical disk 1, and is driven in axial and radial directions of the optical disk 1 by means of an actuator (not shown) provided on the upper part of the main body of an optical pickup 3. The optical pickup 3 applies laser light to the lens 2, and receives reflected light from the optical disk 1 to generate a signal that detects track crossing of the laser light on the optical disk 1 (hereinafter, abbreviated as a "track crossing signal"), a signal that detects deviation of the lens 2 from the center position on the optical pickup 3 (hereinafter, abbreviated as a "position detection signal"), a signal that indicates defocusing of the later light on the optical disk 1 (hereinafter, abbreviated as a "focus error signal"), and a signal that indicates deviation of the laser light from the center of the track (hereinafter, abbreviated as a "tracking error signal"). A traverse driving means 4 moves the optical pickup 3 in the radial direction of the optical disk 1. A speed control means 5 measures a movement speed of the lens 2 on the basis of the track crossing signal that is generated by the optical pickup 3, and controls an actuator driving means 8 for following a target movement speed. Further, a position control means 6 controls the actuator driving means 8 in accordance with the tracking error signal generated by the optical pickup 3 such that the lens 2 follows the center position of the optical pickup 3.

A multiplier A 11 multiplies an output from the speed control means 5 by "α" (0≦α≦1). A multiplier B 12 multiplies an output from the position control means 6 by "1−α". An adder 13 adds outputs from the multiplier A 11 and the multiplier B 11. An addition result from the adder 13 is inputted to the actuator driving means 8 as a control input. A switching means 50 for switching between the output from the speed control means 5 and the output from the position control means 6 is constituted by the multiplier A 11, the multiplier B 12, and the adder 13.

The actuator driving means 8 controls the actuator that is provided on the optical pickup 3 to drive the lens 2 in the axial and radial directions of the optical disk 1. A system control means 9 reads a target speed of the optical pickup 3 that is previously set in a speed profile 10, thereby to control the traverse driving means 4 and the actuator driving means 8. The system control means 9 further controls the switching means 50 for switching between the position control means 6 and the speed control means 5 in stages. The speed profile 10 is a table in which patterns for increasing/decreasing the driving speed to promptly move the optical pickup 3 to a target track are described. A track lead-in means 30 guides the optical pickup 3 to the center position of the tracks on the optical disk 1 in accordance with the tracking error signal, and it can make the optical pickup 3 follow the center position of the tracks on the optical disk 1.

Figure 2:
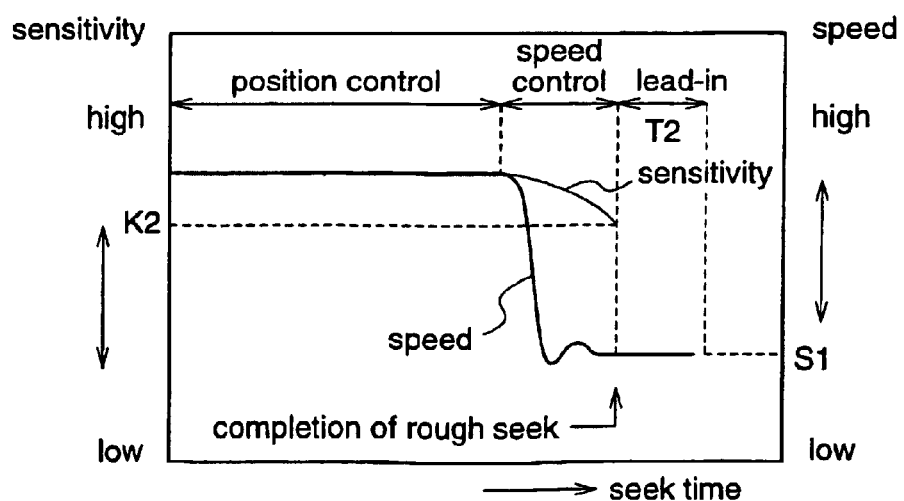
FIG. 2 is a diagram for explaining an operation of the optical disk device according to the first embodiment immediately before an end of seeking.

A seek operation of the optical pickup in the optical disk device that is constructed as described above will be described with reference to FIG. 2. In FIG. 2, the ordinate represents the sensitivity and movement speed of the lens 2, and the abscissa represents the seek time.

Initially, at the high-speed movement of the lens 2 and the optical pickup 3, from when the seek operation is started till the optical pickup 3 reaches the vicinity of the target track, the system control means 9 sets the multiplier factor α for the multipliers A 11 and B 12 at zero, and the position control means 6 controls the actuator driving means 8, thereby keeping the actuator sensitivity of the lens 2 in a good condition.

Then, after the optical pickup 3 reaches the vicinity of the target track, the system control means 9 gradually increases the multiplier factor α for the multipliers A 11 and B 12 from 0 to 1 at a predetermined ratio, and makes the speed control means 5 gradually operate, thereby enabling the movement speed of the lens 2 to follow the movement speed of the optical disk 1 due to the eccentricity. In this figure, reference S1 denotes the speed of the optical disk 1 due to the eccentricity, and the lens 2 is controlled to follow the speed S1. The control of the actuator driving means 8 is gradually changed from the control by the position control means 6 to the control by the speed control means 5 as described above, so that the vibrations of the lens 2 are reduced, and the switching from the position control means 6 to the speed control means 5 can be performed at a position that is nearer to the target track as compared to the conventional switching position. Accordingly, the operation for leading into the target track can be started in a state in which the lens shift amount of the lens 2 is small, and the actuator sensitivity is satisfactorily high. More specifically, the actuator sensitivity at the track leading-in is turned into K2, which is higher than the conventional actuator sensitivity K1. Consequently, the lead-in time T2 is completed in a time period shorter than the conventional lead-in time T1, whereby the entire seeking can be completed in a shorter time period.

As described above, in the optical disk device according to the first embodiment, the control of the actuator driving means 8 by means of the position control means 5 is performed up to immediately before the leading into the target track, and when the optical pickup reaches the vicinity of the target track, the control of the actuator driving means 8 is smoothly switched from the control by the position control means 6 to the control by the speed control means 5. Accordingly, the movement speed of the lens can be made follow the movement speed of the optical disk due to the eccentricity, with holding the actuator sensitivity of the lens satisfactory, whereby the leading into the target track can be performed in a shorter time period.

[Embodiment 2]

An optical disk device according to a second embodiment of the present invention will be described.

The difference of the optical disk device of this second embodiment from the optical disk device of the first embodiment is that in the first embodiment the multiplier factor α of the multipliers A 11 and B 12 is changed by the system control means 9 at a predetermined ratio and the control of the actuator driving means 8 is smoothly switched from the position control means 6 to the speed control means 5, while in the second embodiment the multiplier factor α is changed by the system control means 9 according to the number of remaining tracks up to the target track.

The structure of the optical disk device according of the second embodiment is the same as that of the optical disk device according to the first embodiment.

Figure 3:
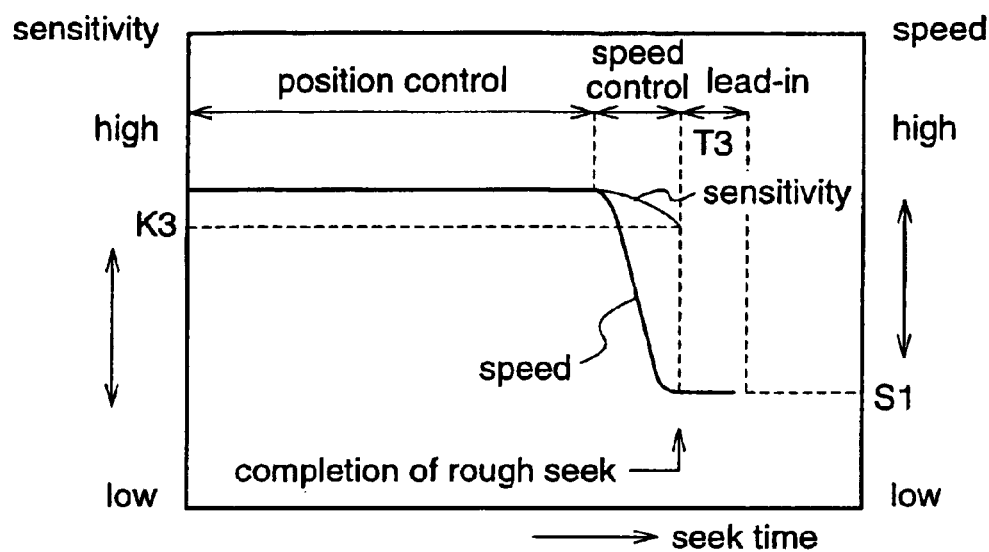
FIG. 3 is a diagram for explaining an operation of an optical disk device according to a second embodiment of the present invention immediately before an end of seeking.

Hereinafter, an operation of the optical pickup in the optical disk device according to the second embodiment immediately before the end of seeking will be described with reference to FIG. 3.

More specifically, after the optical pickup 3 reaches the vicinity of the target track, the multiplier factor α for the multipliers A 11 and B 12 is set such that the factor becomes 1 at a time when the number of remaining tracks up to the target track turns to zero. That is, the multiplier factor is set so as to increase proportionally to the number of remaining tracks. Accordingly, as shown in FIG. 3, the switching from the position control means 6 to the speed control means 5 can be smoothly performed, and a timing of the switching from the position control means 6 to the speed control means 5 can be delayed with respect to the switching timing of the first embodiment. To be more specific, the actuator sensitivity at the track leading-in turns into K3, which is higher than the actuator sensitivity K2 in the first embodiment, whereby the lead-in time T3 can be made shorter than the lead-in time T2 of the first embodiment. Consequently, the entire seek operation can be finished in a shorter time period.

As described above, in the optical disk device according to the second embodiment, the control of the actuator driving means 8 is smoothly switched from the control by the position control means 6 to the control by the speed control means 5 according to the number of remaining tracks up to the target track toward which the optical pickup 3 is moved. Therefore, the vibrations of the lens 2 can be suppressed, and the leading into the target track can be realized in a shorter time period.

[Embodiment 3]

An optical disk device according to a third embodiment of the present invention will be described.

The difference of the optical disk device of the third embodiment from the optical disk device of the first embodiment is that in the first embodiment the switching means performs switching from the position control means 6 to the speed control means 5 by changing the multiplier factor α at a predetermined ratio, while in the third embodiment the switching from the position control means 6 to the speed control means 5 is performed at the time of change in the target speed that is set in the speed profile 10.

The structure of the optical disk device according to the third embodiment is the same as that of the optical disk device according to the first embodiment.

Figure 4:
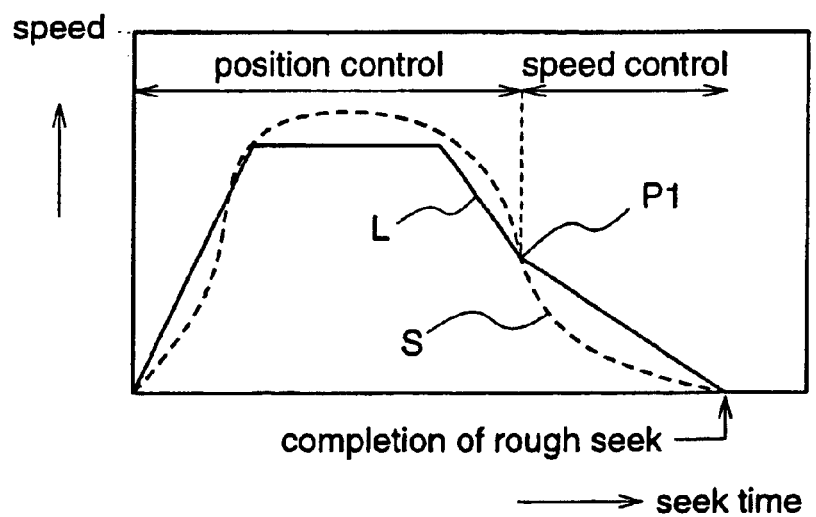
FIG. 4 is a diagram for explaining a seek operation of an optical disk device according to a third embodiment of the present invention.

Hereinafter, a seek operation of the optical disk device according to the third embodiment will be described with reference to FIG. 4. In FIG. 4, the ordinate represents the movement speed of the lens 2, and the abscissa represents the seek time. A full line L shows the operation of the lens 2 under control of the position control means 6, and a broken line S shows the operation of the lens 2 under control of the speed control means 5. Further, reference P1 denotes a deceleration point in the speed profile 10, at which the target speed is changed, whereby the seek time can be reduced and more stable landing to the target track can be achieved.

According to the optical disk device of the third embodiment, in the case of the control by the position control means 6, the lens 2 follows the center position of the optical pickup 3. At this time, the optical pickup 3 is driven by the traverse driving means 4 according to the acceleration/deceleration pattern that is previously set in the speed profile 10. Therefore, the optical pickup 3 is not affected by the eccentricity of the optical disk 1 or the like. On the other hand, in the case of the control by the speed control means 5, when the track crossing signal indicating that the laser light crosses the tracks on the optical disk 1 is detected, the movement speed of the lens 2 is measured, and the actuator driving means 8 is controlled so that the movement speed of the lens 2 turns into a target movement speed, so that the lens 2 is affected by the eccentricity of the optical disk 1 or the like. Accordingly, the lens 2 performs seeking while changing the speed in a long cycle, as shown by the broken line in FIG. 4.

In the common seek operation, the movement speed of the lens is gradually increased from the start of the seek operation, then when the movement speed of the lens reaches a predetermined speed this speed is kept for a predetermined time, and thereafter the speed is gradually decreased so as to stably reach a target track, as shown in FIG. 4. This acceleration and deceleration pattern is preciously set in the speed profile 10 shown in FIG. 1. Further, a speed curve L under control of the position control means 6 and a speed curve S under control of the speed control means 5 vary as follows. When the target speed is changed, the speed curve L varies prior to the speed curve S. Thus, a difference between the speeds during this time is gradually increased and, after a while, the speed curve S gradually gains on the speed curve L, so that the speed curve S gets closer to the speed curve L again.

When the control of the actuator driving means 8 is switched from the control by the position control means 6 to the control by the speed control means 5 at a deceleration point P1 as shown in FIG. 4, the switching can be performed in a state where the difference in speeds is small, whereby the swings of the lens 2 can be suppressed. Further, the switching by the switching means 50 from the position control means 6 to the speed control means 5 is completed in a shorter time, thereby reducing the seek time.

As described above, according to the optical disk device of the third embodiment, the control of the actuator driving means 8 is switched from the control by the position control means 6 to the control by the speed control means 5 at the change of the target speed in the speed profile 10. Accordingly, the swings of the lens 2 are suppressed, and the switching from the position control means 6 to the speed control means 5 is completed in a shorter time, thereby reducing the seek time.

[Embodiment 4]

An optical disk device according to a fourth embodiment of the present invention will be described.

The difference of the optical disk device according to the fourth embodiment from the optical disk device of the third embodiment is that in the third embodiment a point at which the target speed that is set in the speed profile 10 is changed, i.e., the deceleration point is only P1, while there are two deceleration points in the fourth embodiment.

The optical disk device according to the fourth embodiment has the same structure as that shown in FIG. 1.

Hereinafter, a seek operation of the optical disk device according to the fourth embodiment will be described with reference to FIG. 5. FIG. 5(a) is a diagram for explaining control of the optical pickup 3 by the traverse driving means. In FIG. 5(a), the ordinate represents the movement speed of the lens 2, and the abscissa represents the seek time. Further, a full line L shows an operation of the lens 2 under control of the position control means 6, and a broken line S shows an operation of the lens 2 under control of the speed control means 5. Further, references P2 and P3 denote deceleration points which are set in the speed profile 10. In FIG. 5(b), the ordinate represents the distribution of the control on the actuator driving means 8 between the position control means 6 and the speed control means 5, and the abscissa represents the seek time. The control distribution represented by the ordinate shows the ratio of the multiplier factor α for the multipliers A 11 and B 12 in FIG. 1. For example, when the multiplier factor α is zero, it shows that 100% of the control of the actuator driving means 8 by the position control means 6 is effective.

Here, the system control means 9 decides the control distribution between the position control means 6 and the speed control means 5 according to the number of change points in the target speed which are previously set in the speed profile 10. The switching means 50 performs switching from the position control means 6 to the speed control means 5 in accordance with the decided control distribution.

Figure 5:
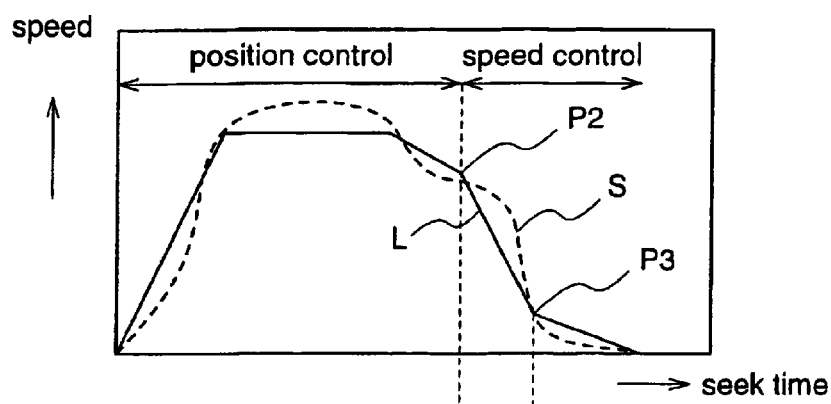
FIGS. 5(a) and 5(b) are diagrams for explaining a seek operation of an optical disk device according to a fourth embodiment of the present invention.
Figure 5:
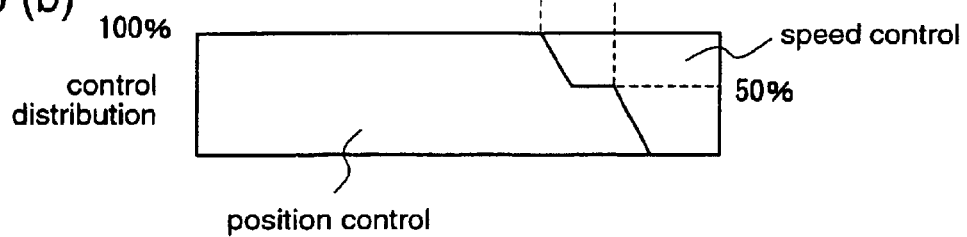

For example, when the deceleration points P2 and P3 are set as shown in FIG. 5, the system control means 9 increases the multiplier factor α for the multipliers A 11 and B 12 at the first changing point P2 from 0 (zero) to 0.5, thereby setting each of distributed controls of the position control means 6 and the speed control means 5 at 50%. Then, at the next changing point P3, the system control means 9 increases the multiplier factor α from 0.5 to 1, thereby setting the distributed control of the speed control means 5 at 100%. As described above, the control of the actuator driving means 8 is switched from the position control means 6 to the speed control means 5 in two stages, so that the swings of the lens are suppressed further, and the switching from the position control means 6 to the speed control means 5 by the switching means 50 is completed in a shorter time, thereby further reducing the seek time.

In this fourth embodiment, the target speed is changed twice at the deceleration of the optical pickup 3, while the number of times by which the target speed is changed may be set at three. In this case, the control distribution between the position control means 6 and the speed control means 5 can be changed by one-third at one time. The operation is performed similarly in cases where the number of change times is four or more.

According to the optical disk device of the fourth embodiment, the control of the actuator driving means 8 is smoothly switched from the control by the position control means 6 to the control by the speed control means 5 according to the number of changes in the target speed of the optical pickup 3, so that the swings of the lens 2 are suppressed further more and the switching from the position control means 6 to the speed control means 5 is completed in a shorter time, thereby further reducing the seek time.

[Embodiment 5]

An optical disk device according to a fifth embodiment of the present invention will be described.

In the conventional optical disk device, when a track crossing signal of the optical disk 1 lacks due to vibrations or noise from outside or the movement speed of the lens 2 extremely changes during the control of the actuator driving means 8 by the speed control means 5, the control by the speed control means 5 does not work normally and, in worst cases, the traverse driving runs out of control. The fifth embodiment solves such a problem.

Figure 6:
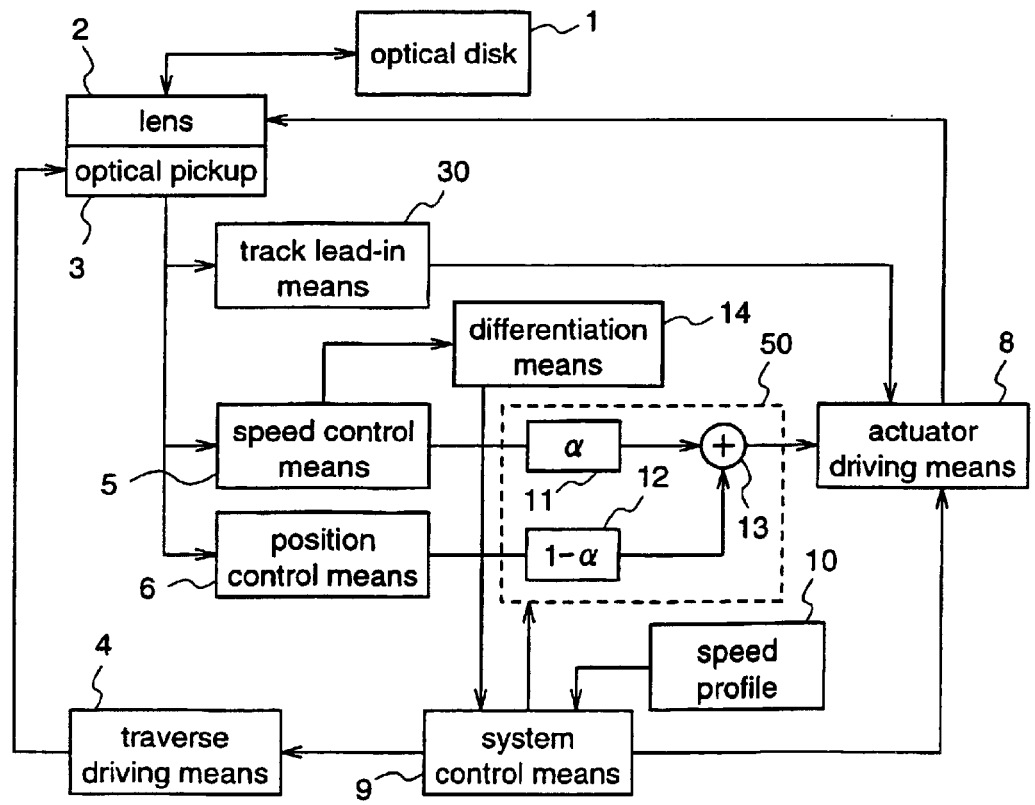
FIG. 6 is a block diagram illustrating a structure of an optical disk device according to a fifth embodiment of the present invention.

FIG. 6 is a block diagram illustrating a structure of an optical disk device according to the fifth embodiment. In this figure, the same or corresponding components as those in FIG. 1 are denoted by the same reference numerals.

A differentiation means 14 measures the amount of changes in the movement speed of the lens 2, which is measured by the speed control means 5.

Figure 7:
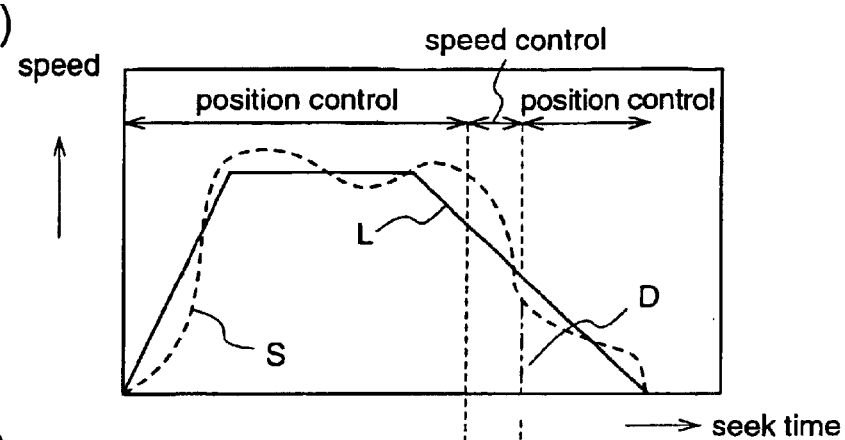
FIGS. 7(a) and 7(b) are diagrams for explaining a seek operation of the optical disk device according to the fifth embodiment.
Figure 7:
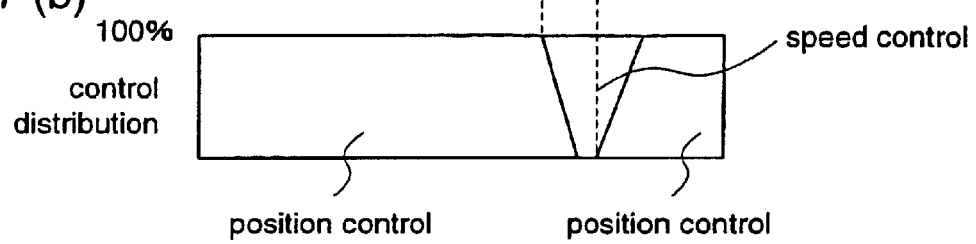

Hereinafter, a seek operation of the optical disk device according to the fifth embodiment will be described with reference to FIG. 7. FIG. 7(a) is a diagram for explaining control of the optical pickup 3 by the traverse driving means. In FIG. 7(a), the ordinate represents the movement speed of the lens, and the ordinate represents the seek time. In addition, a full line L shows an operation of the lens 2 under control of the position control means 6, and a broken line S shows an operation of the lens 2 under control of the speed control means 5. Further, reference D denotes a time when the system control means 9 detects that the speed control means 5 does not operate normally. In FIG. 7(b), the ordinate represents distribution of the control on the actuator driving means 8 between the position control means 6 and the speed control means 5, and the abscissa represents the seek time.

Initially, the system control means 9 sets the multiplier factor α for the multipliers A 11 and B 11 at 0 (zero) from when the seek operation is started till the optical pickup reaches the vicinity of the target track, to perform control of the actuator driving means 8 by the position control means 6.

Then, after the optical pickup reaches the vicinity of the target track, the system control means 9 gradually increases the multiplier factor α, thereby gradually making the speed control means operate. At this time, the differentiation means 14 measures the amount of changes in the movement speed of the lens 2, which is measured by the speed control means 5, and informs the system control means 9 of an abnormal operation in the speed control by the speed control means 5 when the measured amount of changes is larger than a predetermined amount. Then, when the system control means 9 detects the abnormal operation in the speed control by the speed control means 5 (time D), the system control means gradually changes the multiplier factor α for the multipliers A 11 and B 12 from 1 to 0 (zero), and controls the switching means 50 to switch the control of the actuator driving means 8 from the control by the speed control means 5 to the control by the position control means 6 in stages. Thereby, the abnormal operation such as runaway of the traverse driving, which is caused by the abnormal operation in the speed control by the speed control means 5, can be prevented.

As described above, according to the optical disk device of the fifth embodiment, the control of the actuator is performed by the position control means 6 from when the start of seeking till the optical pickup 3 reaches the vicinity of the target track, and the control of the actuator is switched from the position control means 6 to the speed control means 5 in stages when the optical pickup has reached the vicinity of the target track, as in the first embodiment. Further, when the amount of changes in the movement speed of the lens 2 gets larger than a predetermined amount during the control by the speed control means 5, it is decided that the speed control means 5 does not operate normally, and the control of the actuator is returned to the control by the position control means 6, thereby preventing the abnormal operations of the traverse driving, such as runaway.

[Embodiment 6]

An optical disk device according to a sixth embodiment of the present invention will be described.

The difference of the optical disk device according to the sixth embodiment from the optical disk device according to the fifth embodiment is that in the fifth embodiment the switching between the speed control means 5 and the position control means 6 is performed according to the amount of changes in the movement speed of the lens 2, while in the sixth embodiment the abnormal operation of the speed control means 5 is detected on the basis of the track crossing signal that detects track crossing, to perform the switching between the speed control means 5 and the position control means 6.

Figure 8:
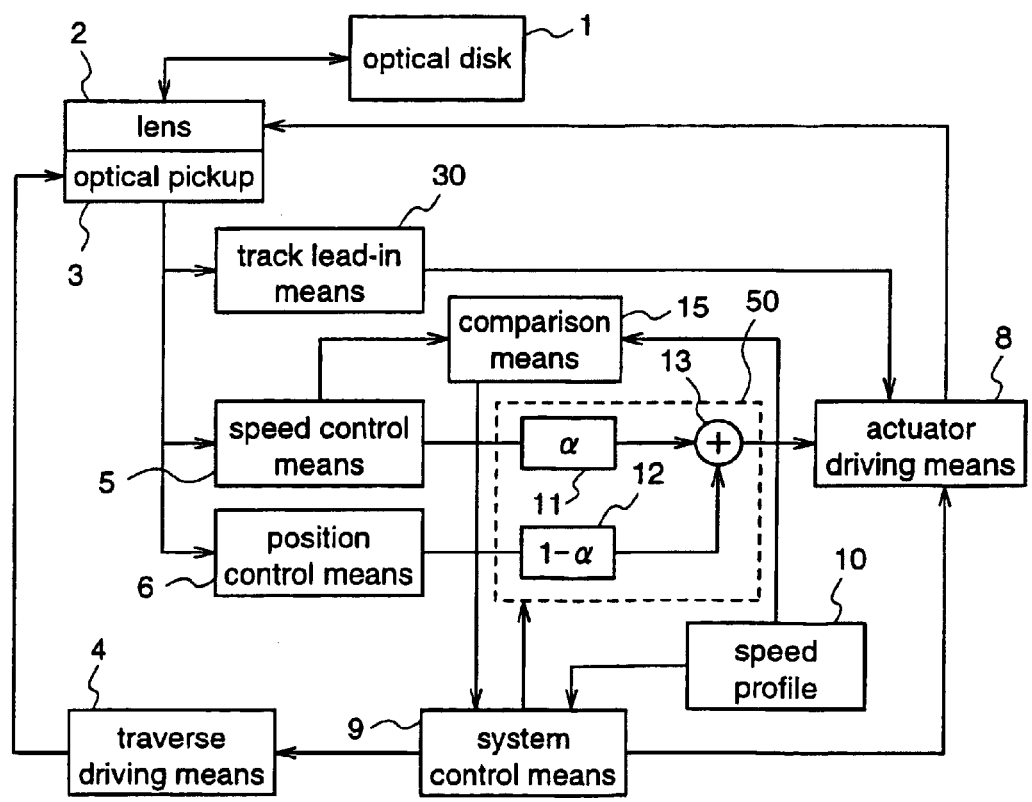
FIG. 8 is a block diagram illustrating a structure of an optical disk device according to a sixth embodiment of the present invention.

FIG. 8 is a block diagram illustrating a structure of the optical disk device according to the sixth embodiment. In this figure, the same or corresponding components as those in FIG. 1 are denoted by the same reference numerals.

A comparison means 15 compares the movement speed of the lens 2 which is measured by the speed control means 5, with the target speed of the optical pickup 3 which is previously set in the speed profile 10.

An operation of the optical disk device according to the sixth embodiment, which is constructed as described above, will be described with reference to FIGS. 7 and 8. As FIG. 7 have been described in the fifth embodiment, the operation from the start of seeking until the optical pickup reaches the vicinity of the target track is omitted, and an operation after the optical pickup has reached the vicinity of the target track is described.

After the optical pickup has reached the vicinity of the target track, the comparison means 15 compares the movement speed of the lens 2 which is measured by the speed control means 5 with the target speed of the optical pickup 3 which is previously set in the speed profile 10, during the control of the actuator driving means 8 by the speed control means 5. When a difference between the speeds is larger than a predetermined value, the comparison means 15 informs the system control means 9 of an abnormal operation in the speed control by the speed control means 5. Then, when detecting the abnormal operation in the speed control by the speed control means 5 (time D), the system control means 9 gradually changes the multiplier factor α for the multipliers A 11 and B 12 from 1 to 0 (zero), and controls the switching means 50 to switch the control of the actuator driving means 8 from the control by the speed control means 5 to the control by the position control means 6 in stages. Thereby, abnormal operations such as runaway of the traverse driving, which are caused by the abnormal operation in the speed control by the speed control means 5 can be prevented.

As described above, according to the optical disk device of the sixth embodiment, the control of the actuator is performed by the position control means 6 from the start of seeking till the optical pickup 3 reaches the vicinity of the target track, and the control of the actuator is switched from the control by the position control means 6 to the control by the speed control means 5 in stages after the pickup has reached the vicinity of the target track, like in the first embodiment. Further, when the movement speed of the lens 2 goes out of the target speed during the control by the speed control means 5, it is decided that the speed control means 5 does not operate normally, and the control of the actuator is returned to the control by the position control means. Accordingly, abnormal operations such as runaway of the traverse driving can be prevented.

[Embodiment 7]

An optical disk device according to a seventh embodiment of the present invention will be described.

The difference of the optical disk device according to the seventh embodiment from the optical disk device of the fifth embodiment is that in the fifth embodiment the switching between the speed control means 5 and the position control means 6 is performed according to the amount of changes in the movement speed of the lens 2, while in the seventh embodiment an abnormal operation in the speed control means is detected from the focus error signal indicating defocusing of the laser light on the optical disk 1, thereby to perform the switching between the speed control means 5 and the position control means 6.

Figure 9:
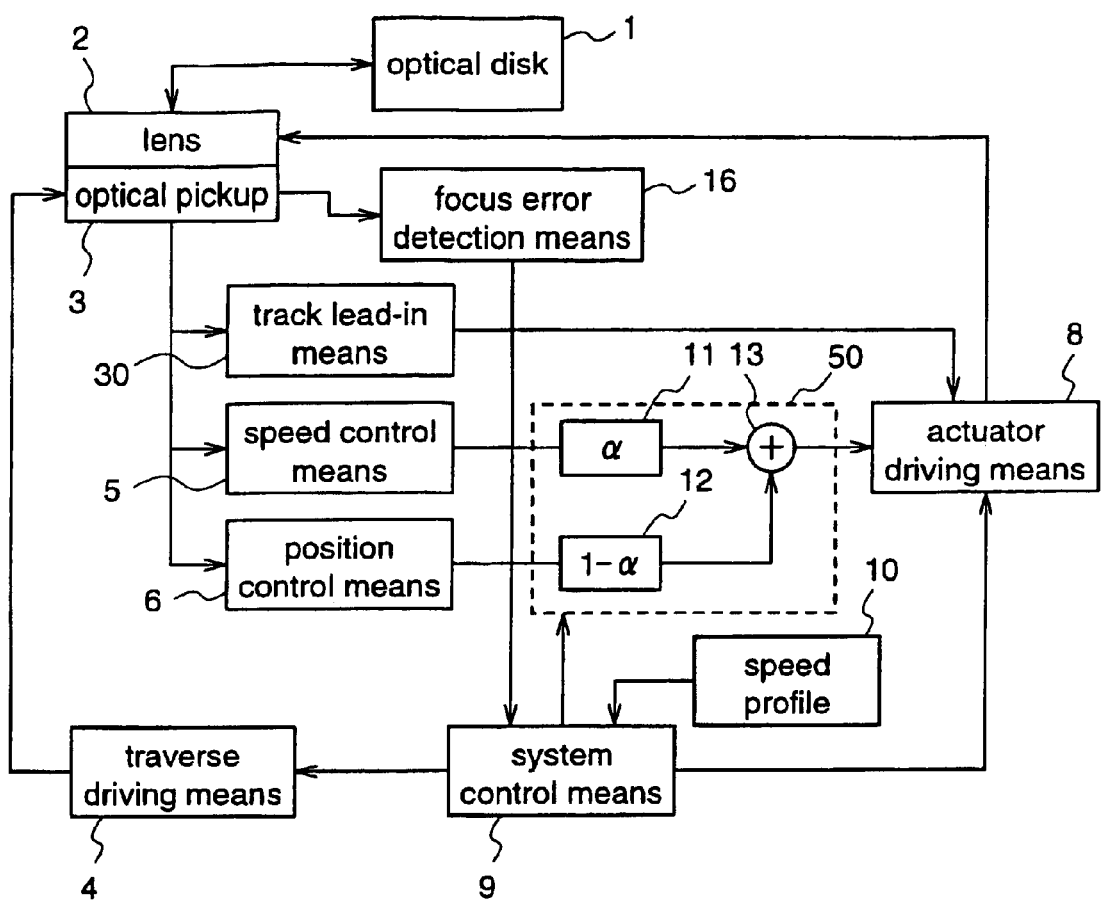
FIG. 9 is a block diagram illustrating a structure of an optical disk device according to a seventh embodiment of the present invention.

FIG. 9 is a block diagram illustrating a structure of the optical disk device according to the seventh embodiment. In this figure, the same or corresponding components as those in FIG. 1 are denoted by the same reference numerals.

A focus error detection means 16 measures a deviation amount of a focus of the laser light on the optical disk 1 on the basis of the focus error signal that is generated by the optical pickup 3.

An operation of the optical disk device according to the seventh embodiment, which is constructed as described above, will be described with reference to FIGS. 7 and 9. As FIG. 7 have been described in the fifth embodiment, the operation from the start of seeking till the optical pickup reaches the vicinity of the target track is omitted, and an operation after the optical pickup has reached the vicinity of the target track is described.

After the optical pickup has reached the vicinity of the target track, the focus error detection means 16 measures the deviation amount of the focus of the laser light on the optical disk 1 on the basis of the focus error signal that is generated by the optical pickup 3, during the control of the actuator driving means 8 by the speed control means 5. When the deviation amount of the focus is larger than a predetermined value, the focus error detection means 16 decides that defocusing occurs, and informs the system control means 9 of the abnormal operation in the speed control by the speed control means 5. Then, when detecting the abnormal operation in the speed control by the speed control means 5 (time D), the system control means 9 gradually changes the multiplier factor α for the multipliers A 11 and B 12 from 1 to 0 (zero), and controls the switching means 50 to switch the control of the actuator driving means 8 from the control by the speed control means 5 to the control by the position control means 6 in stages. Accordingly, abnormal operations such as runaway of the traverse driving, which are caused by the abnormal operation in the control by the speed control means 5 can be prevented.

As described above, according to the optical disk device of the seventh embodiment, the control of the actuator is performed by the position control means 6 from the start of seeking till the optical pickup 3 reaches the vicinity of the target track and the control of the actuator is switched from the control by the position control means 6 to the control by the speed control means 5 in stages after the optical pickup has reaches the vicinity of the target track, like in the first embodiment, and further when the defocusing of the laser light on the optical disk 1 occurs during the control by the speed control means 5, it is decided that the speed control means 5 does not operate normally, and the control of the actuator is returned to the control by the position control means 6. Therefore, abnormal operations such as runaway of the traverse driving, which are caused by the lack of the track crossing signal of the optical disk 1 or the like can be prevented.

[Embodiment 8]

An optical disk device according to an eighth embodiment of the present invention will be described with reference to FIGS. 10 and 11.

The optical disk device according to the eighth embodiment is different from the optical disk device of the first embodiment in that a timing of switching from the position control means 6 to the speed control means 5 can be set at the vicinity of the target track.

Figure 10:
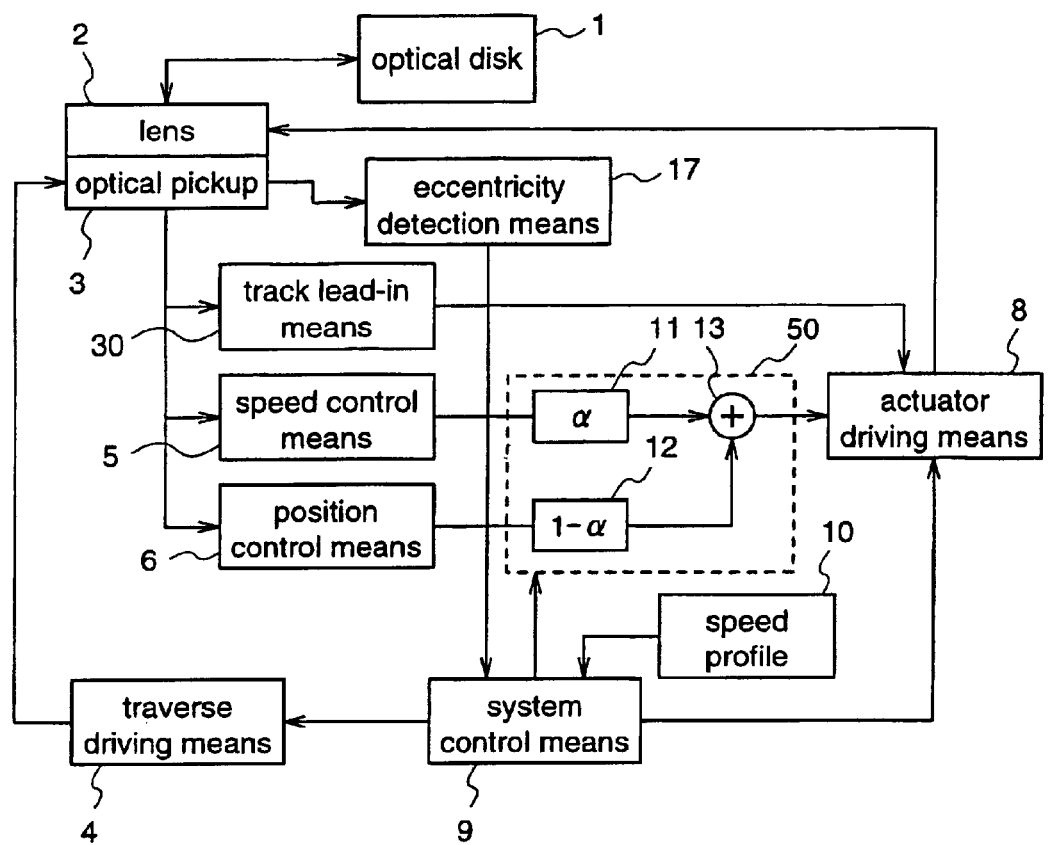
FIG. 10 is a block diagram illustrating an optical disk device according to an eighth embodiment of the present invention.
Figure 11:
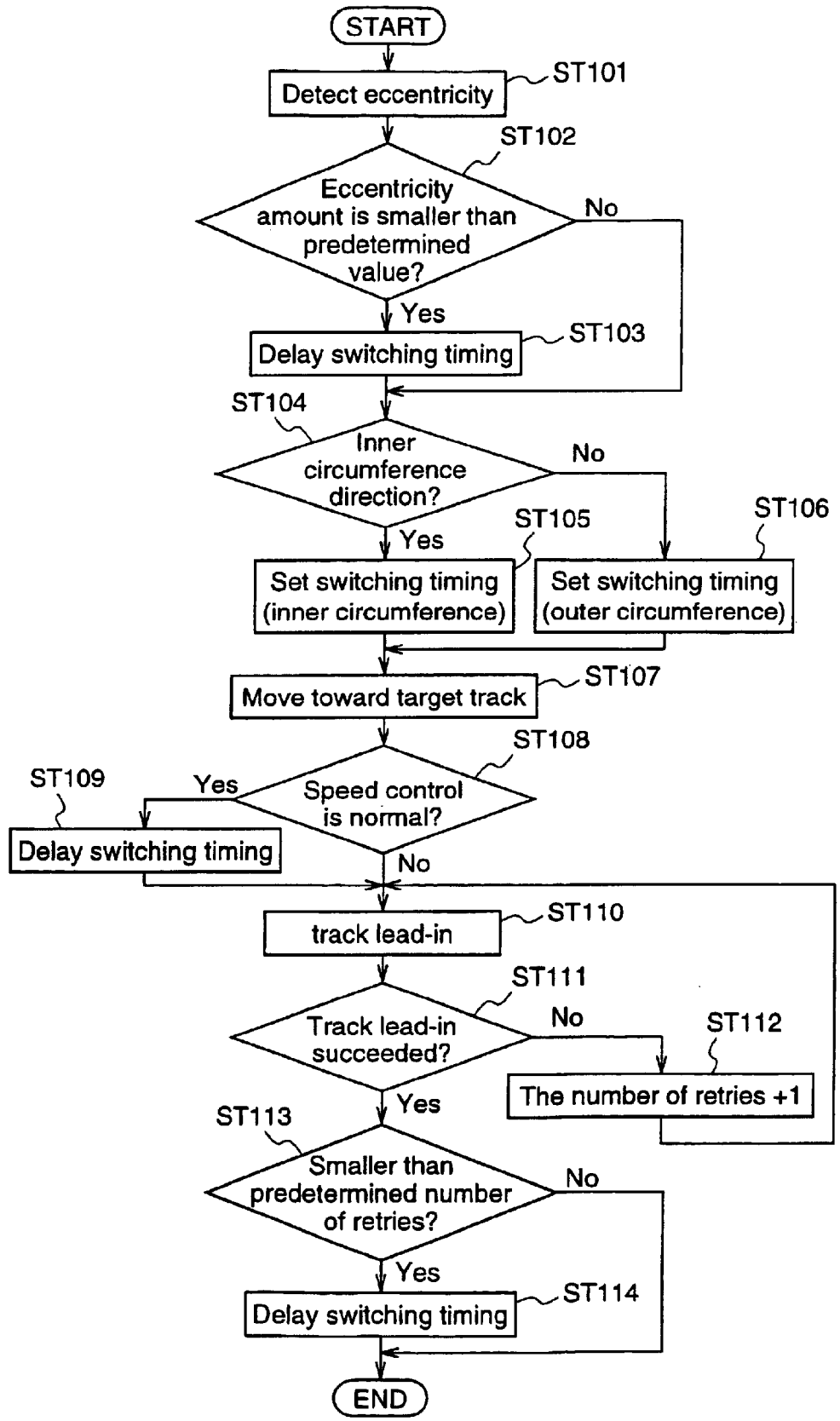
FIG. 11 is a flowchart showing a seek operation of the optical disk device according to the eighth embodiment.

FIG. 10 is a block diagram illustrating a structure of the optical disk device according to the eighth embodiment. In this figure, the same or corresponding components as those in FIG. 1 are denoted by the same reference numerals.

An eccentricity detection means 17 measures the amount of eccentricity of the optical disk 1 on the basis of the track crossing signal that detects track crossing of the laser light on the optical disk 1, which is generated by the optical pickup 3. When the amount of eccentricity (the number of track crossings) of the optical disk 1, which is measured by the eccentricity detection means 17, is smaller than a predetermined value, the system control means 9 adjusts the timing of switching from the position control means 6 to the speed control means 5 by the switching means 50 to be as near the target track as possible.

A seek operation of the optical disk device according to the eighth embodiment, which is constructed as described above, will be described with reference to FIG. 11.

Initially, prior to the seek operation, the amount of eccentricity in the optical disk 1 is detected by the eccentricity detection means 17 in step ST 101, and then whether the detected amount of eccentricity in the optical disk 1 is smaller than a predetermined value or not is decided (ST 102). When the detected amount is smaller, the operation proceeds to ST 103, in which a timing of the switching from the position control means 6 to the speed control means 5 by the switching means 50 is delayed further up to a position nearer the target track. On the other hand, when the detected amount of eccentricity is larger than the predetermined value, the operation proceeds to ST 104.

Next, in ST 104, it is decided whether the direction in which the seeking is performed is toward inner circumferences or outer circumferences of the optical disk 1. When the seeking direction is toward the inner circumferences, the operation proceeds to ST 105, in which the timing of the switching by the switching means 50 is set at a timing that is adjusted for the inner circumference direction. On the other hand, when the direction in which the seeking is performed is toward outer circumferences of the optical disk 1, the operation proceeds to ST 106, in which the timing of the switching by the switching means 5 is set at a timing that is adjusted for the outer circumference direction.

Next, in ST 107, the optical pickup 3 is moved toward the target track. In ST 108, it is decided whether the control by the speed control means 5 has been completed normally before rough seeking is completed. When the control has been completed normally, the operation proceeds to ST 109, in which the timing of the switching by the switching means 50 is delayed further up to a position nearer the target track. When the control by the speed control means 5 has not been completed normally, the operation proceeds to ST 110.

Then in ST 110, an operation for leading into the target track is started. In ST 111, it is decided whether the leading into the target track has been successively performed and the optical pickup has reached the track on the optical disk 1 or not. When the leading-in has resulted in failure, the operation proceeds to ST 112, in which the number of times by which the leading-in operation has been repeated is counted as the number of retries. On the other hand, when the leading into the track has been successively performed, the operation proceeds to ST 113, in which it is decided whether the number of retries by which the track leading-in operation has been repeated is smaller than a predetermined number. When the number of retries is smaller than the predetermined number, the operation proceeds to ST 114, in which the timing of switching by the switching means 50 is delayed further up to a position nearer the target track, and then the operation is finished. On the other hand, when the number of retries is larger then the predetermined number, the operation is finished.

As described above, according to the optical disk device of the eighth embodiment, when the amount of eccentricity of the optical disk 1 is smaller than the predetermined value, the control of the actuator driving means 8 is switched from the control by the position control means 6 to the control by the speed control means 5 at a track that is nearer the target track than a preset track. Therefore, the lens 2 can be made follow the eccentricity of the optical disk 1 with maintaining high actuator sensitivity, thereby further shortening the time for leading into the target track.

Further, according to the optical disk device of the eighth embodiment, when the speed control by the speed control means 5 is performed normally and the lens 2 sufficiently follows the eccentricity of the optical disk 1, the timing for switching the control of the actuator driving means 8 from the position control means 6 to the speed control means 5 at the next seeking can be set to a position that is nearer to the target track. Therefore, the time for leading into the target track can be shortened similarly.

Further, according to the optical disk device of the eighth embodiment, when the number of retries of the track leading-in is smaller than a predetermined number after the track leading-in operation has been finished, the timing of switching from the position control means 6 to the speed control means 5 at the next seeking is set at a position nearer the target track. Therefore, the time for leading into the target track can be shortened similarly.

Further, according to the optical disk device of the eighth embodiment, it is decided whether the optical pickup 3 is moved in the direction toward the inner circumferences of the optical disk 1 or the direction toward the outer circumferences, and the timing of the switching from the position control means 6 to the speed control means 5 is set adaptively to each direction. Therefore, the difference in mechanism characteristics according to the directions in which the optical pickup 3 is moved are absorbed, and an optimum switching timing can be set adaptively to each direction.

[Embodiment 9]

An optical disk device according to a ninth embodiment of the present invention will be described.

The difference of the optical disk device according to the ninth embodiment from the optical disk device of the first embodiment is that in the first embodiment the control by the speed control means 5 and the control by the position control means 6 are performed at the ratio $\alpha:(1-\alpha)$, while in this ninth embodiment the controls by these means are performed at a ratio $(2n-1)/2n:1/2n$.

Figure 12:
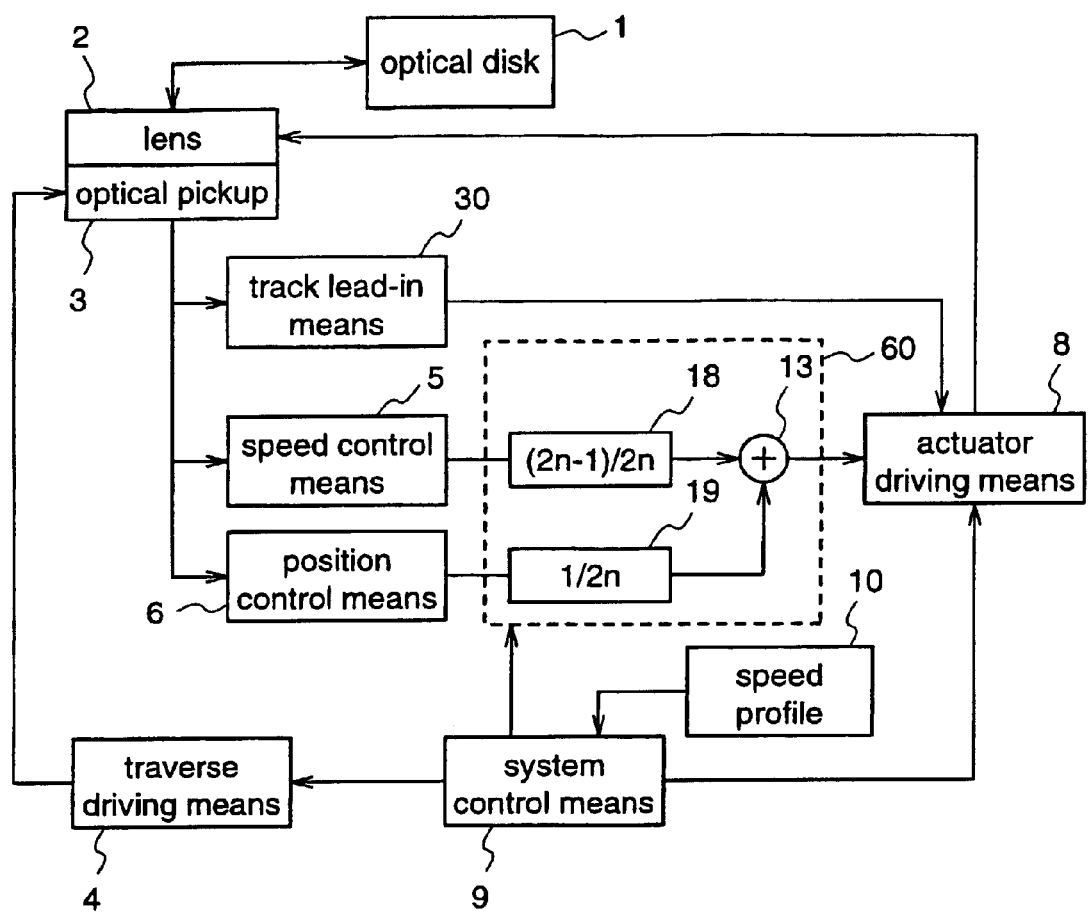
FIG. 12 is a block diagram illustrating a structure of an optical disk device according to a ninth embodiment of the present invention.

FIG. 12 is a block diagram illustrating a structure of the optical disk device according to the ninth embodiment. In FIG. 12, the same or corresponding components as those in FIG. 1 are denoted by the same reference numerals.

A switching means 60 includes a shift register A 18 for multiplying an output of the speed control means 5 by $(2n-1)/2n$ $(n>0)$, a shift register B 19 for multiplying an output of the position control means 6 by $1/2n$, and an adder 13 for adding an output of the shift register A 18 and an output of the shift register B 19.

An operation of the optical disk device that is constructed as described above will be described.

Initially, at high-speed movements of the lens 2 and the optical pickup 3 from start of seeking till the optical pickup reaches the vicinity of the target track, the control of the actuator driving means 8 is performed by the position control means 6, thereby keeping the lens 1 in a high sensitivity state.

Then, after the optical pickup reaches the vicinity of the target track, "n" for the shift registers A 18 and B 19 is set so that the speed control means 5 is gradually made operate, and the movement speed of the lens 2 can follow the movement speed of the optical disk 1 due to the eccentricity.

For example, a case where n is set at 1 by the system control means 9 is described. In this case, the shift register A 18 multiplies an output of the speed control means 5 by 1/2, and the shift register B 19 multiplies an output of the position control means 6 by 1/2. That is, distribution of the control on the actuator driving means between the speed control means 5 and the position control means 6 is 1:1. A case where n is set at 2 by the system control means 9 is further described. In this case, the shift register A 18 multiplies the output of the speed control means 5 by 3/4, and the shift register B 19 multiplies the output of the position control means 6 by 1/4. That is, the distribution of the control on the actuator driving means between the speed control means 5 and the position control means 6 is 3:1. When n is set by the system control means 9 as described above, the control of the actuator driving means 8 can be gradually changed from the control by the position control means 6 to the control by the speed control means 5 in a relatively simple method, thereby making the lens follow the eccentricity of the optical disk with maintaining a high sensitivity of the actuator.

As described above, according to the optical disk device of the ninth embodiment, the control of the actuator driving means 8 is smoothly switched from the control by the position control means 6 to the control by the speed control means 5 by the switching means 60 comprising the shift registers A 18 and B 19, and the adder 13. Therefore, the time for leading into the target track and, consequently, the seek time can be reduced without employing a complicated calculation means but with a simple construction.

[Embodiment 10]

An optical disk device according to a tenth embodiment of the present invention will be described.

Figure 13:
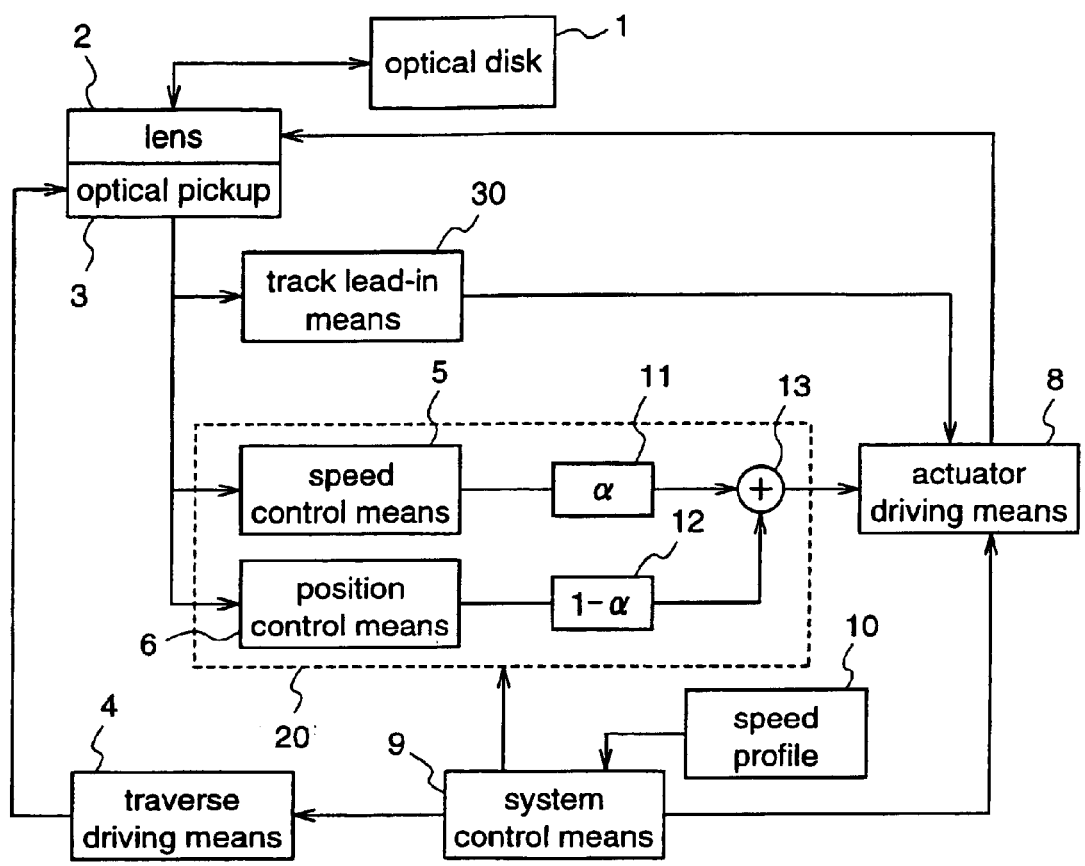
FIG. 13 is a block diagram illustrating a structure of an optical disk device according to a tenth embodiment of the present invention.
Figure 14:
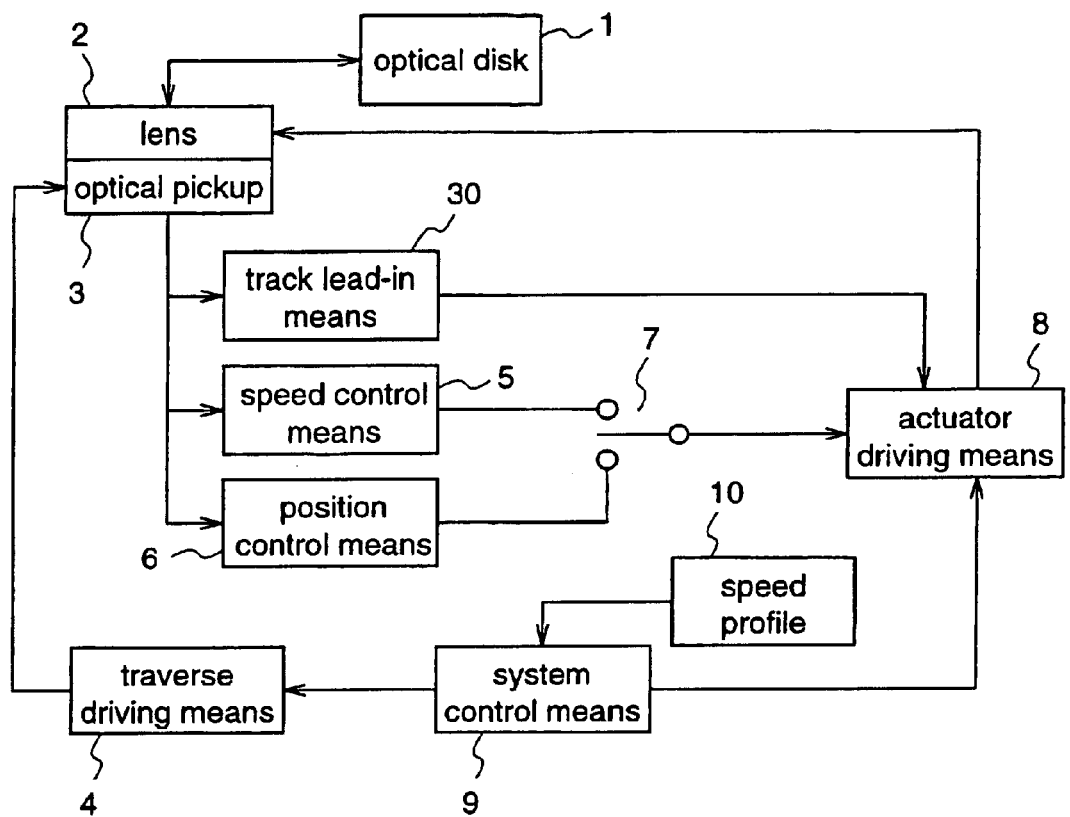
FIG. 14 is a block diagram illustrating a structure of a prior art optical disk device.
Figure 15:
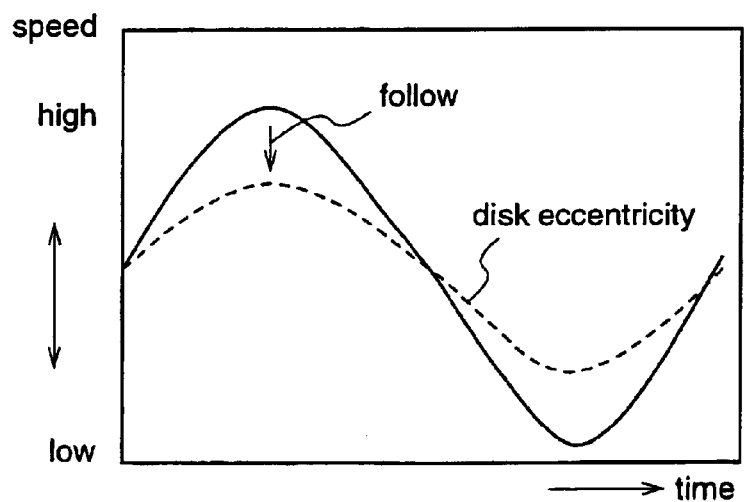
FIG. 15 is a diagram for explaining an operation of a speed control means in the prior art optical disk device.
Figure 16:
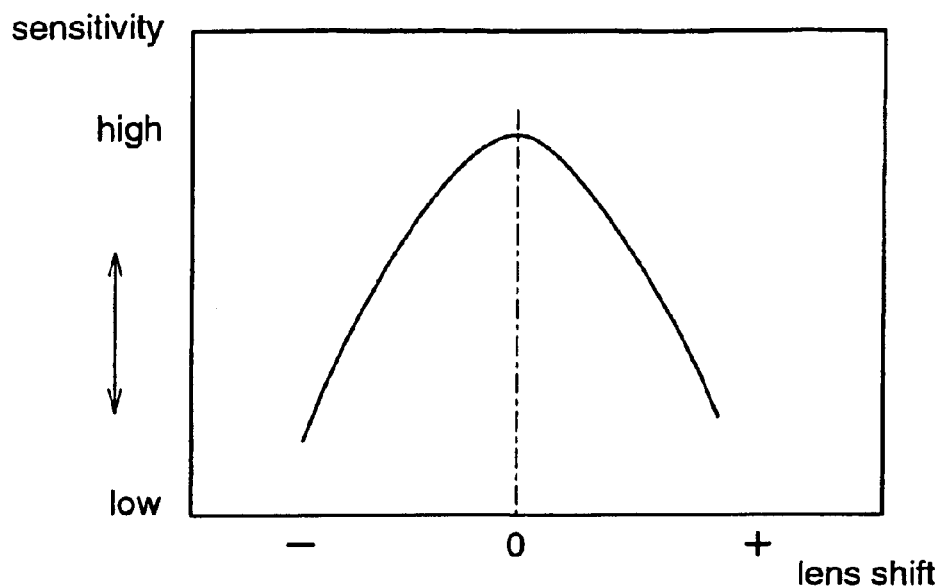
FIG. 16 is a diagram for explaining an operation of a position control means in the prior art optical disk device.
Figure 17:
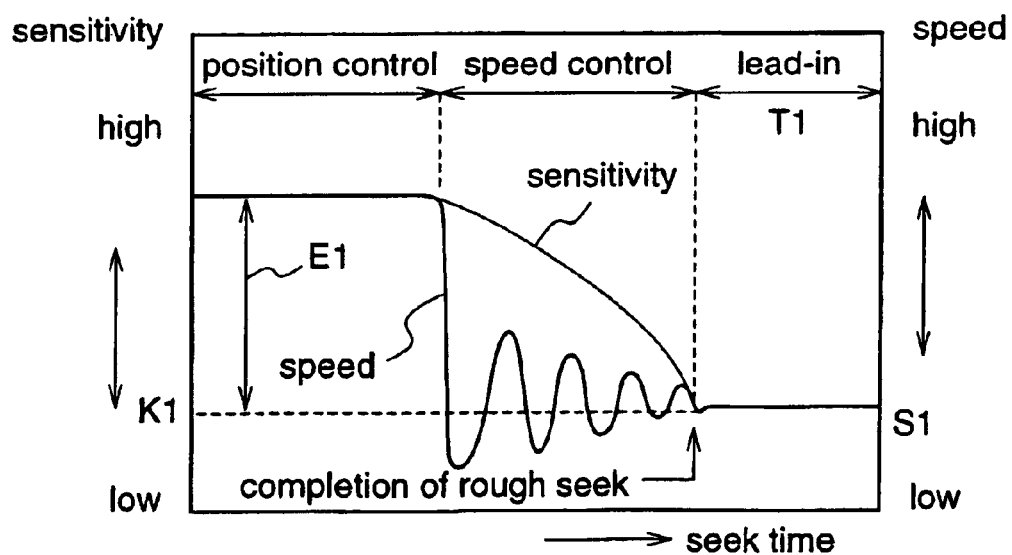
FIG. 17 is a diagram for explaining an operation of the prior art optical disk device immediately before an end of seeking.

FIG. 13 is a block diagram illustrating a structure of the optical disk device according to the tenth embodiment. In this figure, the same or corresponding components as those in FIG. 1 are denoted by the same reference numerals.

In FIG. 13, the optical disk device according to the tenth embodiment includes the speed control means 5, the position control means 6, and the switching means 50 that is constituted by the multipliers A 11 and B 12 and the adder 13 according to the first embodiment, as a DSP (Digital Signal Processor) 20, and implements the DSP by a software processing operation.

An operation of the optical disk device that is constructed as described above will be described.

Initially, at high-speed movements of the lens 2 and the optical pickup 3 from start of seeking till the optical pickup reaches the vicinity of the target track, the control of the actuator driving means 8 is performed by the position control means 6 to keep the lens 2 in a high sensitivity state, while after the optical pickup reaches the vicinity of the target track, the speed control means 5 is gradually made operate, thereby changing the movement speed of the lens 2 into the movement speed of the optical disk 1 according to the eccentricity. At this time, the speed control means 5 and the position control means 6 require servo filters for following the target value, while this filter processing is carried out by digital filter processing in the DSP 20. Accordingly, the operation processings by the multipliers A 11 and B 12 and the adder 13 are also carried out in the same DSP 20, with delivery of data between the registers, resulting in high-speed processing.

As described above, according to the optical disk device of the tenth embodiment, operation processing is carried out by the DSP 20 that carries out the digital filtering process, so that high-speed operation processing can be performed without requiring excess hardware, whereby the delay caused by the operation processing becomes small, and the switching between the speed control means 5 and the position control means 6 is smoothly performed.

What is claimed is:

1. An optical disk device, comprising:

a lens;

an optical pickup for applying laser light to an optical disk via the lens, and receiving reflected light from an optical disk;

an actuator for driving the lens in axial and radial directions of an optical disk;

a traverse driving means for driving the optical pickup in a radial direction of an optical disk so that a movement speed of the optical pickup becomes a preset target speed;

a position control means for controlling the driving of the actuator so that the lens follows a center position of the optical pickup;

a speed control means for controlling the driving of the actuator so that the lens has the target movement speed;

a switching means for switching driving control of the actuator between the position control means and the speed control means; and a system control means for controlling the switching means to select the position control means when a seek operation is started, while selecting the speed control means when the optical pickup approaches a vicinity of a target track on an optical disk, wherein the system control means is for controlling the switching means to gradually change an allocation of the driving control of the actuator between the position control means and the speed control means.

2. The optical disk device of claim 1, wherein the system control means is for proportionally increasing allocation of the driving control of the actuator by the speed control means according to a number of remaining tracks up to the target track while moving the optical pickup to a vicinity of the target track on an optical disk, thereby switching the driving control of the actuator from the position control means to the speed control means in stages.

3. The optical disk device of claim 1, wherein the system control means is for controlling the switching means when the preset target speed of the optical pickup changes.

4. The optical disk device of claim 3, wherein the system control means is for proportionally increasing allocation of the driving control of the actuator by the speed control means according to a number of points in time at which a target speed of the optical pickup is changed by the switching means, from the position control means to the speed control means.

5. The optical disk device of claim 1, wherein the system control means is for switching driving control of the actuator from the speed control means to the position control means, when the system control means detects that the speed control means is not operating normally while the speed control means is controlling the driving of the actuator.

6. The optical disk device of claim 5, comprising:

a differentiation means for obtaining a differential value of a movement speed of the lens, which is measured by the speed control means, and deciding that the speed control means is not operating normally when the obtained differential value is larger than a predetermined value, wherein the system control means is for controlling the switching means on the basis of a result of a decision by the differentiation means.

7. The optical disk device of claim 5, comprising:

comparison means for obtaining a difference between a movement speed of the lens, which is measured by the speed control means, and the preset target speed, and deciding that the speed control means is not operating normally when the difference is larger than a predetermined value, wherein the system control means is for controlling the switching means on the basis of a result of the decision by the comparison means.

8. The optical disk device of claim 5, comprising:

a focus error detection means for measuring an amount of focus deviation of laser light on an optical disk when a focus error signal indicating a focus deviation of such laser light on such optical disk is detected from reflected light received by the optical pickup, and deciding that the speed control means is not operating normally when the deviation amount is larger than a predetermined value, wherein the system control means is for controlling the switching means on the basis of a result of the decision by the focus error signal detection means.

9. The optical disk device of claim 1, wherein the system control means is for adjusting a timing of switching by the switching means from the position control means to the speed control means so that the switching occurs at a first position adjacent the target track.

10. The optical disk device of claim 9, comprising:

an eccentricity detection means for measuring an amount of eccentricity of an optical disk on the basis of a track crossing signal indicating track crossing of laser light, which is detected from reflected light received by the optical pickup, wherein the system control means is for adjusting the timing of switching by the switching means from the position control means to the speed control means so that switching occurs at a second position adjacent the target track when an eccentricity amount of the optical disk, measured by the eccentricity detection means, is less than a predetermined value, said second position being closer to the target track than the first position.

11. The optical disk device of claim 9, wherein the system control means is for adjusting the timing of switching by the switching means from the position control means to the speed control means to be at a second position adjacent the target track when control for driving the actuator by the speed control means has been performed normally and a next movement of the optical pickup to the target track has been performed, said second position being closer to the target track than the first position.

12. The optical disk device of claim 9, wherein when the optical pickup has been led into the target track after a rough seek operation for moving the optical pickup to a position adjacent the target track on an optical disk has been completed, the system control means is for counting a number of re-leading processes when leading the optical pickup into the track has failed and then re-leading is performed, and is for adjusting the timing of switching by the switching means from the position control means to the speed control means to be at a second position adjacent the target track at a next movement of the optical pickup to the target track on an optical disk, when the counted number of re-leading processes is smaller than a preset number after the leading operation has been finished, said second position being closer to the target track than the first position.

13. The optical disk device of claim 9, wherein the system control means is for judging a movement direction in which the optical pickup has been moved toward the target track on an optical disk, and for setting timings of switching by the switching means from the position control means to the speed control means adaptively to an inner circumference direction and an outer circumference direction of an optical disk, respectively.

14. The optical disk device of claim 1, comprising:

the switching means comprises a first shift register for multiplying an output signal of the speed control means "$\alpha$" ($0 \leq \alpha \leq 1$); a second shift register for multiplying an output signal of the position control means by "$1-\alpha$"; and an adder for adding output signals of the first and second shift registers, wherein the system control means is for gradually increasing a value of "$\alpha$" of the first shift register to gradually increase allocation of control for driving the actuator by the speed control means, over control for driving the actuator by the position control means.

15. The optical disk device of claim 1, comprising:

a semiconductor element comprising the speed control means, the position control means and the switching means.

* * * * *